Knight & Orne,
Shutter Fastener.
№ 49,535.        Patented Aug. 22, 1865
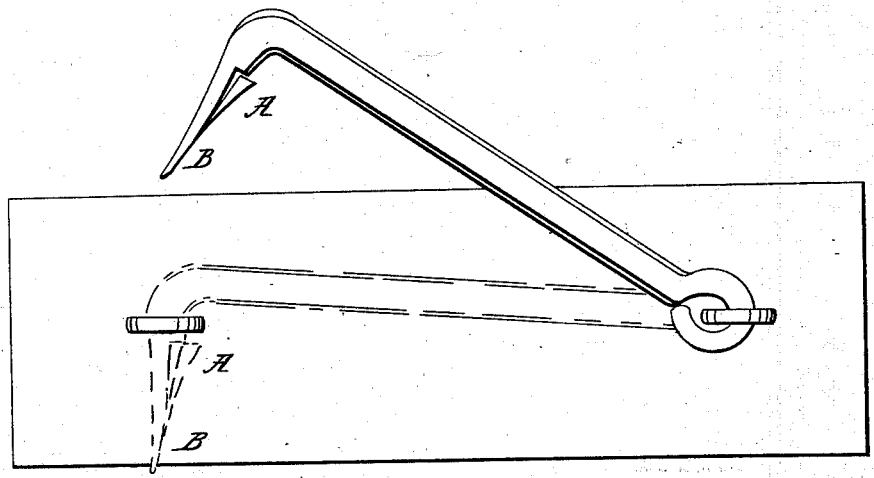
Witnesses:
William Gilley Jr.
Daniel P.C. Hathaway
Inventors:
William M. Knight
Jonathan H. Orne

UNITED STATES PATENT OFFICE.

WM. M. KNIGHT AND JONATHAN H. ORNE, OF MARBLEHEAD, MASS.

IMPROVEMENT IN HOOKS.

Specification forming part of Letters Patent No. 49,535, dated August 22, 1865.

*To all whom it may concern:*

Be it known that we, WILLIAM M. KNIGHT and JONATHAN H. ORNE, both of Marblehead, in the county of Essex and Commonwealth of Massachusetts, have invented a new and Improved Hook for Doors, Shutters, Blinds, &c., and we do hereby declare that the following is a true and exact description thereof, reference being had to the accompanying drawing, and to the letters of reference marked thereon.

The nature of our invention consists in attaching to the ordinary hook that passes through the staple a spring, which prevents the hook from being withdrawn from the staple without the application of lateral pressure directly upon the spring.

To enable others skilled in the art to make and use our invention, we will proceed to describe its construction and operation.

We make the hook of any of the ordinary forms, and of any material, and attach thereto a spring, A B, attaching it to the hook at the point B by a rivet, or in any convenient manner.

The most convenient and least expensive kind of spring is a simple strip of metal attached to the hook at such an angle that the end A, in its natural position, will be at such a distance from the opposite part of the hook as to come under the staple when the hook is fastened, and prevent the hook from being withdrawn without pressing upon the side of the strip. Upon the removal of the pressure the strip will resume its original relative position. The spring will yield so as to allow the hook to pass into the staple.

We do not, however, confine ourselves to the kind of spring above described, but use any convenient spring.

By the use of our improvement the hook cannot be sprung out of the staple by a blow upon the back of the door, shutter, or gate, nor pushed up by a lever inserted from the other side of the door, &c., nor easily raised by young children or animals.

In the drawing, A B represent the spring or strip upon which the spring operates, and B the point at which the strip is attached to the hook. The black lines show the improved hook as it appears out of the staple, and the red lines show it as it appears in the staple to fasten the door, &c.

What we claim as our invention, and desire to secure by Letters Patent, is—

The application to a common hook, substantially of the shape exhibited in the drawing accompanying this application, of a spring which will allow the hook easily to pass into the staple, but will prevent it from being withdrawn therefrom without the application of lateral pressure upon the spring, substantially as herein described.

WILLIAM M. KNIGHT.
JONATHAN H. ORNE.

Witnesses:
WILLIAM GILLEY, Jr.,
DANIEL R. HATHAWAY.